United States Patent [19]
Taylor

[11] Patent Number: 5,122,946
[45] Date of Patent: Jun. 16, 1992

[54] QUASI PUSH-PULL SINGLE SWITCH CURRENT-FED FLY-BACK CONVERTER

[75] Inventor: Brian E. Taylor, Maldon, England

[73] Assignee: International Rectifier Corporation, El Segundo, Calif.

[21] Appl. No.: 719,200

[22] Filed: Jun. 21, 1991

[51] Int. Cl.⁵ .................................................. H02M 3/335
[52] U.S. Cl. ................................. 363/21; 363/61; 219/10.55 B
[58] Field of Search ................... 219/10.55 B; 363/20, 363/21, 61, 97, 131

[56] References Cited

U.S. PATENT DOCUMENTS

| | | | |
|---|---|---|---|
| 4,499,531 | 2/1985 | Bral | 363/21 |
| 4,833,581 | 5/1989 | Ishiyama | 363/61 |
| 4,866,589 | 9/1989 | Satoo et al. | 363/97 |
| 4,868,729 | 9/1989 | Suzuki | 363/21 |
| 4,900,885 | 2/1990 | Inumada | 219/10.55 B |
| 4,903,183 | 2/1990 | Noguchi et al. | 219/10.55 B |
| 4,931,609 | 6/1990 | Aoki | 363/97 |
| 5,001,318 | 3/1991 | Noda | 363/97 |
| 5,012,058 | 4/1991 | Smith | 219/10.55 B |
| 5,019,954 | 5/1991 | Bourgeault et al. | 363/21 |
| 5,021,620 | 6/1991 | Inumada | 219/10.55 B |

Primary Examiner—Jeffrey Sterrett
Attorney, Agent, or Firm—Osterlenk, Faber, Gerb & Soffen

[57] ABSTRACT

A quasi push-pull single switch current-fed fly-back converter is used as the power supply for the magnetron of a microwave oven. A voltage doubler output circuit has a high impedance. A small magnetic circuit includes a transformer having a primary winding in series with an IGBT switch means and in series with an inductor. A single diode is connected in series with the inductor. A secondary winding is connected to the voltage doubler. A tertiary winding is coupled to a pulse width modification, i.e. for controlling the conductor sequence of the IGBT.

17 Claims, 2 Drawing Sheets

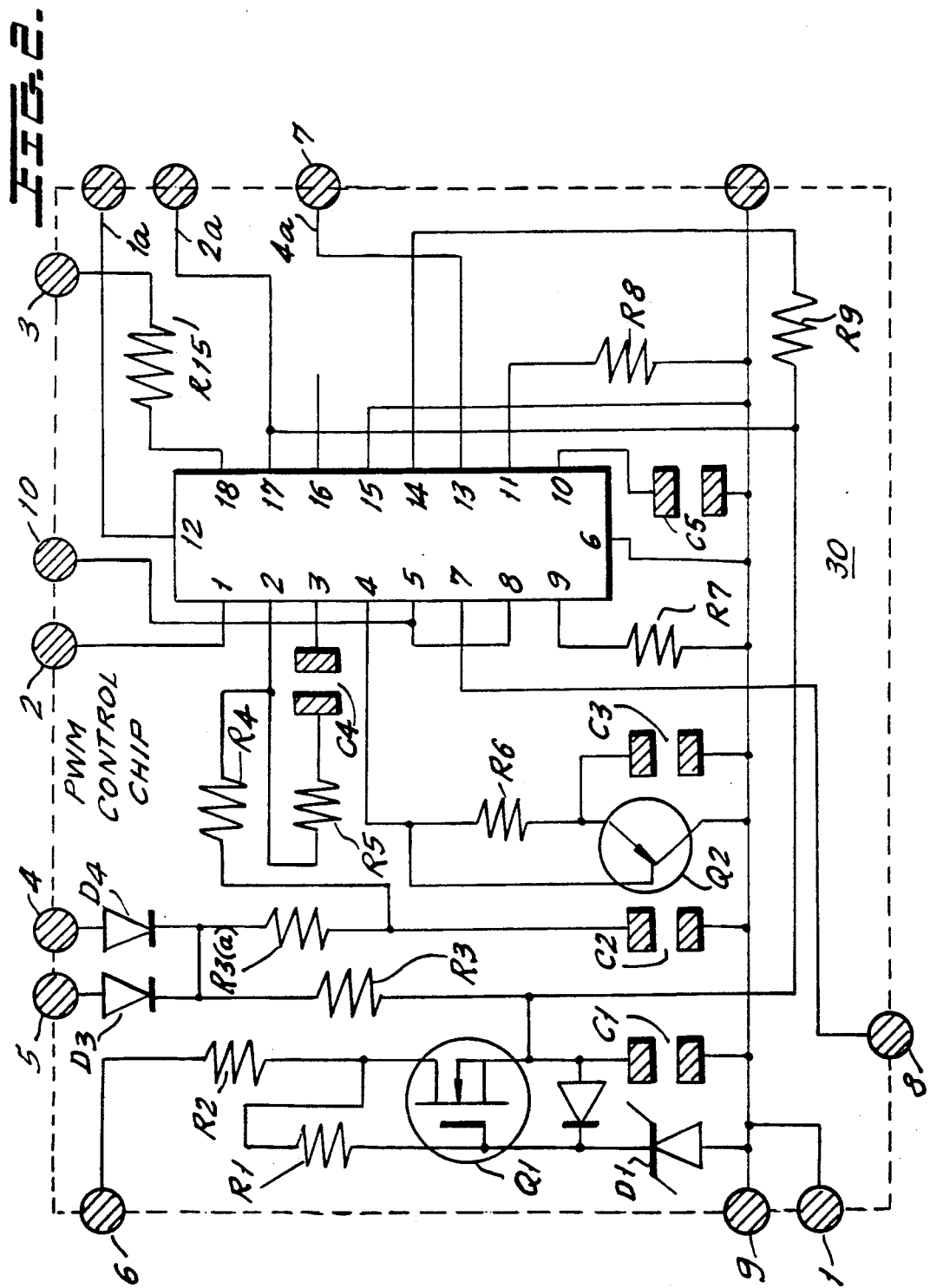

QUASI PUSH-PULL SINGLE SWITCH CURRENT-FED FLY-BACK CONVERTER

FIELD OF THE INVENTION

This invention relates to switch mode power supplies and, more particularly, to a quasi push-pull single switch, fly-back converter power supply for providing a high voltage, high impedance power output to the magnetron of a microwave oven.

BACKGROUND OF THE INVENTION

Microwave ovens commonly employ a magnetron which operates in a continuous wave (CW) mode as their heating source. The power supply for the magnetron element is critical to its reliability and start-up performance. The primary requirements of the power supply are:
1. A high output impedance which reduces sudden load current increase by rapidly reducing the available output voltage below the threshold value of the Magnetron.
2. It must supply the heater power of the magnetron while having a high output impedance.
3. It must be able to accommodate safety features while still having high output impedance and providing heater power.
4. It should have minimum weight, volume and cost.

Power supplies which fulfill these requirements commonly utilize a voltage doubler as the output rectifier. A voltage doubler has a high output impedance due to the inherent "soft regulation" nature of a voltage doubler.

Presently used converter topologies employ some form of a fly-back variant, either quasi square-wave or resonant, with switching being performed by a single component to minimize cost. However, neither type satisfies the requirements above as optimally as possible. Thus, for a magnetron for a 700 watt RF power microwave oven, the quasi-resonant fly-back converter requires a high cost semiconductor switch which must have both a high blocking voltage capability (in excess of 1200 volts for a 220 volts AC line) and also be able to pass currents in excess of 35 amperes. Similarly, the quasi-square wave fly-back converter requires an expensive semiconductor switch of similar capability to that of the resonant variant, for example, 1000 volts blocking and 55 amperes.

Another disadvantage of prior art power supplies for the magnetron of a microwave oven is the size, weight and cost of the magnetic components. Thus, power supplies presently used for microwave ovens of 700 watts RF power and a 50/60 Hz transformer weigh about 4 kilograms. They are relatively expensive and take up considerable volume within the oven housing.

A large variety of such converter circuits is in the prior art. Thus, the patent to Yamato et al. U.S. Pat. No. 4,777,575 describes a switching power supply for providing power to the magnetron of a microwave oven in which a transformer primary winding is series connected with a single transistor switch 31 controlled by driver 81 of a control circuit 8 that receives feedback from the secondary of the transformer. Energy is stored in an inductor and is transferred during the switch-off time.

Diaz U.S. Pat. No. 4,837,670 discloses a switch mode converter with an inductive winding in series with a solid state switch operated by a control circuit 10. An output sense-circuit, taken from the secondary of the transformer, provides a feedback signal to the control circuit. A circuit which provides bias voltage to the control circuit also reduces peak power dissipation when the switch is off; no separate secondary winding is used.

Gautherin et al. U.S. Pat. No. 4,675,796 describe a switching power supply that uses a capacitor in series with a diode across the primary transformer winding so that energy stored when the switch is on is diverted to the output of the converter when the switch is off so as to provide non-dissipative snubbing. High frequency switching occurs by means of FET in series with the primary of transformer.

Kuster U.S. Pat. No. 4,561,046 describes a switching converter with a protective network that diverts energy to the output rather than dissipating stored energy through a resistor. By having the magnetizing and snubbing currents diverted to the output during the switch-off time, the main switch only conducts the reflected current and not the magnetizing and snubbing currents.

Stevens U.S. Pat. No. 4,734,636 describes a switching-line regulation circuit that avoids a snubbing network by having the switch operate when no current is passing through it. The circuit does not use a feedback control circuit from a transformer secondary. A current loop circuit is formed of an inductor in series with solid state switch and a shunting diode so that, when the switch is off, current flows through the inductor and diode. A snubbing network is provided across the switch. Output to the load is taken across a capacitor rather than from the secondary of a transformer.

In Suko U.S. Pat. No. 4,866,586, a switching arrangement employing four switches is disclosed.

In Underhill U.S. Pat. No. 4,760,324, power from a snubber circuit is also used by the driver control of a FET switch. Energy stored in a capacitor is transferred by an inductor in combination with two diodes.

The patents to Archer, U.S. Pat. No. 4,365,171, Rilly et al. U.S. Pat. No. 4,864,485 and Cohen U.S. Pat. No. 4,736,285 show other types of converters.

BRIEF DESCRIPTION OF THE INVENTION

The present invention provides a novel electrical circuit for a switch-mode power supply for a magnetron as used in a microwave oven in which the circuit has a high output impedance, can provide heater power to the magnetron, can receive all necessary safety features and has low cost, low weight components.

The novel circuit comprises a fly-back converter operating in either a quasi push-pull square wave or resonant mode, with a single insulated gate bipolar transistor (IGBT) current switch in series on the primary side of a transformer Attached to the secondary of the transformer is an output rectifier comprising a voltage doubler to satisfy the requirement of a high impedance in delivering power to the magnetron.

The input to the circuit is a DC voltage from a rectified a-c line source. An input inductor receiving the d-c voltage forms a current generator such that when the IGBT switch is off, a constant current is circulated in a loop formed by the inductor and a single, inexpensive series connected diode. When the switch is on, the inductor serves to limit the current through the IGBT switch when a short circuit otherwise exists on the primary side. The inductor can be mounted on the same magnetic core as the primary of the transformer.

A capacitor connected to the secondary of the transformer receives and stores energy transferred to the secondary when the MOSFET switch is ON. The voltage doubler formed by the capacitor in conjunction with parallel diodes at the output provides the required high output impedance voltage to the cathode of the magnetron.

Operation is controlled by a control circuit which regulates the switching of the converter, as by pulse width modulation. The control circuit also receives a feedback signal from a split secondary winding of the transformer as a feedback control for the circuit.

Other features and advantages of the present invention will become apparent from the following description of the invention which refers to the accompanying drawings

BRIEF DESCRIPTION OF THE DRAWINGS

FIG. 2 is a more detailed diagram of the power generation and pulse width modulation section of the circuit of FIG. 1.

DETAILED DESCRIPTION OF THE DRAWINGS

Figure 1:
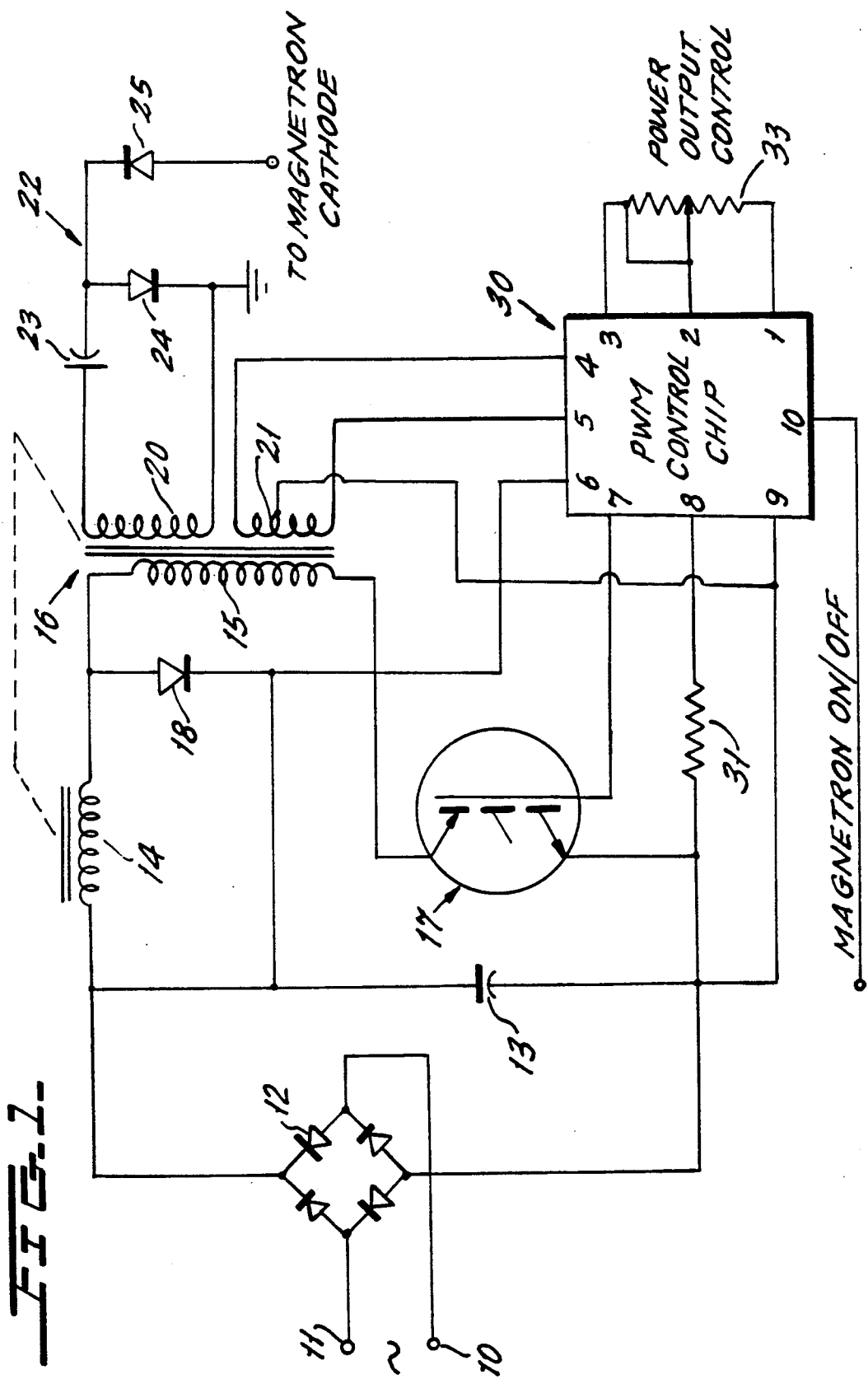
FIG. 1 is a schematic circuit diagram of a single switch, fly-back switch mode converter of the present invention.

Referring first to FIG. 1, there is shown a circuit diagram of the magnetron power supply of the present invention. The power supply is energized from an input a-c source at terminals 10 and 11 which may for example be an 85 to 130 volt power supply at 50 to 60 hertz In particular, the power supply may be an ordinary household power supply. The a-c input terminals are connected to a single phase full wave bridge connected rectifier 12 which produces an output d-c voltage which is connected across capacitor 13.

The positive output terminal of bridge 12 is connected in series with the inductor winding 14, the primary winding 15 of transformer 16 and the power terminals of an insulated gate bipolar transistor (IGBT) 17. A diode 18 is connected in closed series relation with inductor winding 14 as shown.

Transformer 16 has a secondary output winding 20 and a tertiary winding 21 where windings 14, 15, 20 and 21 are all wound on the same magnetic core. While not shown, windings for connection to the heater of a magnetron can also be wound on the core of transformer 16.

The output winding 20 is then connected to a voltage doubler circuit 22 which consists of capacitor 23, diode 24 and diode 25. Diode 25 is connected to the magnetron cathode and diode 24 is connected to the ground of the magnetron and of the circuit as shown The output voltage appearing across the magnetron will be in series with a high output impedance and will thus regulate down as magnetron current increases.

The output voltage to the magnetron is controlled by adjusting the conduction characteristics of IGBT 17 through a suitable control circuit such as a pulse width modulated control circuit A suitable commercially-available control circuit is in a chip type SG3626JC which is a pulse width modulation control chip 30. Any other desired chip can be used.

Chip 30 in FIG. 1 has 10 pins.

Pin 10 is the on-off control pin.

Pins 7 and 8 are connected to control the gate of the IGBT 17. A resistor 31 is connected in that control circuit.

Pins 4, 5 and 9 receive feedback signals and chip power from tertiary winding 21 which is a control winding which monitors the operation of the circuit. Pin 6 is also connected to a signal monitoring output at the node between diode 18 and capacitor 13.

Pins 1, 2 and 3 are connected to potentiometer 33, with its wiper arm connected to pin 2 and its opposite ends connected to pins 1 and 3, respectively. Adjustment of the position of the wiper arm will cause regulation of the on-off sequence of IGBT 17 to regulate the output power at the magnetron cathode terminal connected to diode 25.

The novel circuit of FIG. 1 has a quasi push/pull type structure and operates as follows:

The magnetron is turned on by applying a suitable signal to pin 10. IGBT 17 is switched on and off at a sequence under the control of the chip 30. A relatively constant current will circulate around the path containing inductor 14 and diode 18. Inductor 14 therefore defines a current generator and limits the current through the IGBT 17 when the IGBT 17 is on. Such current limiting action is required due to the effective short circuit which is reflected on primary winding 15 when the IGBT 17 is on.

In a typical circuit for supplying power to a 700 watt RF magnetron, IGBT 17 may be a type number IRGBC30V made by International Rectifier Corporation of El Segundo, Calif., and has a blocking voltage of 600 volts and a forward current rating of almost 23 amperes. Thus, the part is a relatively inexpensive part compared to switches used in the prior art.

So long as the IGBT 17 is on and conducting, energy will be transferred from secondary winding 20 into capacitor 23 for storage. The voltage doubler 22 formed by capacitor 23 and diodes 24 and 25 are required due to the limited capacity to store energy in the anode to cathode capacitance of the magnetron and are used in place of a single rectifier in the output which would be a relatively high cost device. Diodes 24 and 25 are relatively low cost devices rated at 6 kilovolts reverse and 0.35 ampere.

During operation, when the switch 17 turns off, some of the energy stored in the inductance 18 will be transferred into capacitor 23, along with the energy stored in the inductance of transformer 16. This is because both the inductor winding 14 and primary winding 15 and secondary winding 20 are on the same core.

As a result of the quasi push-pull nature of the circuit of FIG. 1, the overall efficiency of the power supply is considerably increased. Moreover, the device components are relatively inexpensive components as will be later seen and have low weight—for example, one kilogram—and will occupy a small volume.

The control circuit 30 of FIG. 1 is preferably a pulse width modulator type of circuit. The output voltage to the magnetron is related to the output voltage on the tertiary winding 21. Chip 30 will vary the signal at pin 7 relative to the signal at pin 8 to maintain the output voltage on the tertiary winding 21 at a value related to the preset value of the power output control input at pins 1, 2 and 3.

Winding 14 of transformer 16 which is used as an inductor is in bucking relationship with respect to winding 15 of transformer 16. In one embodiment of the invention, the transformer 16 was part number 43120203515 made by Phillips. This device has a primary winding 15 of 13.5 turns and a secondary winding

20 of 350 turns. The tertiary winding has approximately 2.5 turns plus 2.5 turns bifilar.

The magnetic core for the inductor 14 was a powder iron toroid and was an 11-turn winding having an inductance of approximately 10 microhenries. Such inductors are available from Micro Metals, Inc. as manufacturer's part number T68-26 Windings 14 and 15 may be on separate cores or alternatively on the same core.

When using a magnetic structure configured in the manner of inductors 14 and transformer 16 with the circuit of FIG. 1, it has been found that the power supply weight for a typical microwave oven of 700 watts RF power at 50/60 hertz is approximately 1 kilogram. By contrast, prior art power supplies for the same power output to the magnetron of a microwave oven have weighed about four kilograms. The lighter weight transformer is, of course, extremely important to low cost, low weight microwave ovens and will occupy considerably less volume within the oven structure.

Referring now to FIG. 2 there is shown therein a more detailed view of the integrated circuit 30 of FIG. 1 which is a commercially available chip SG3626JC. The pin numbers shown in FIG. 2 correspond to the pin numbers of FIG. 1. Power for the control circuit 30 is provided at start-up through transistor Q1, which is a 400 volt MOSFET which functions as a series regulator. The power for MOSFET Q1 is in turn supplied by the rectified line from the main power circuit between pins 6 and 9.

Once the inverter is functioning, power for the control circuit comes from the tertiary winding 21, through diodes D3 and D4 at pins 5 and 4 respectively and resistor R3 in FIG. 2. The feedback control circuit operates through the diodes D3 and D4 and performs the secondary function of controlling the output voltage of the inverter. Since extreme accuracy of output control is not required, this form of feedback is quite adequate for this type circuit The transistor Q2 is used to control soft high-start ramping of the pulse with modulated integrated circuit structures.

In the circuit of FIG. 2, the following component values were used.

| | |
|---|---|
| R1 | 240 ohms |
| R2 | 3.3k ohms |
| R3 | 27 ohms |
| R3(a) | 8.2k ohms |
| R4 | 330k ohms |
| R5 | 56k ohms |
| R6 | 120 ohms |
| R7 | 8.2k ohms |
| R8 | 2 ohms |
| R9 | 220 ohms |
| R15 | 4.7k ohms |
| Resistor 31 (FIG. 1) | 2.86 milliohms |
| C1 | 100 microfarads |
| C2 | 0.1 microfarads |
| C3 | 1 microfarads |
| C4 | 0.0033 microfarads |
| C5 | 0.0047 microfarads |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In combination: a microwave oven having a magnetron, and a low cost, low weight power supply for said magnetron which is fixed within the housing of said microwave oven; said power supply connectable to an a-c source of power and including a d-c converter connected to said a-c source, a capacitor connected across the d-c terminals of said converter, an inductor, a transformer primary winding and a switch means connected in series with each other and in parallel with said capacitor, a transformer secondary winding, a voltage doubler circuit connected to said transformer secondary winding and having an output connected to said magnetron, said inductor, primary winding and secondary winding sharing a common magnetic circuit, a single diode connected in parallel with said inductor and poled to permit continued current flow in said inductor when said switch means is open; and control circuit means for controlling the on and off operation of said switch means in a sequence to produce a desired output voltage from said voltage doubler circuit.

2. The combination of claim 1 wherein said switch means is an IGBT.

3. The combination of claim 1 wherein said magnetron produces about 700 watts and wherein said power supply weighs less than about one kilogram.

4. The combination of claim 3 wherein said switch means is a IGBT.

5. The combination of claim 1 wherein said control circuit means is a pulse-width modulation control circuit.

6. The combination of claim 5 wherein said common magnetic circuit has a tertiary winding thereon; said tertiary winding being coupled to said control circuit means to produce feed back signals for the operation of said control circuit.

7. The combination of claim 6 wherein said switch means is an IGBT.

8. The combination of claim 6 wherein said magnetron produces about 700 watts and wherein said power supply weighs less than about one kilogram.

9. The combination of claim 7 wherein said magnetron produces about 700 watts and wherein said power supply weighs less than about one kilogram.

10. A quasi push-pull single switch current-fed flyback converter circuit operable from a household a-c power source comprising, in combination, a d-c converter connected to said a-c source, a capacitor connected across the d-c terminals of said converter, an inductor, a transformer primary winding and a switch means connected in series with each other and in parallel with said capacitor, a transformer secondary winding and a voltage doubler circuit connected to said transformer secondary winding, said inductor, primary winding and secondary winding sharing a common magnetic circuit, a single diode connected in parallel with said inductor and poled to permit continued current flow in said inductor when said switch means is open, and control circuit means for controlling the on and off operation of said switch in a sequence to produce a desired output voltage from said voltage doubler circuit.

11. The combination of claim 10 wherein said switch means is an IGBT.

12. The combination of claim 10 wherein said control circuit means is a pulse-width modulation control circuit.

13. The combination of claim 10 wherein said common magnetic circuit has a tertiary winding thereon; said tertiary winding being coupled to said control circuit means to produce feed back signals for the operation of said control circuit means.

14. The circuit of claim 10 wherein said circuit is adapted for mounting in a microwave oven and wherein the output of said voltage doubler is connected to the magnetron of said microwave oven; said circuit having a weight of less than about one kilogram.

15. The combination of claim 14 wherein said switch means is an IGBT.

16. The combination of claim 14 wherein said control circuit means is a pulse-width reduction control circuit.

17. The combination of claim 14 wherein said common magnetic circuit has a tertiary winding thereon; said tertiary winding being coupled to said control circuit means to produce feed back signals for the operation of said control circuit means.

* * * * *